(12) United States Patent
Brooks et al.

(10) Patent No.: US 9,937,936 B2
(45) Date of Patent: Apr. 10, 2018

(54) SYSTEM AND METHOD FOR MONITORING COUPLER FATIGUE

(71) Applicant: General Electric Company, Schenectady, NY (US)

(72) Inventors: James D. Brooks, Schenectady, NY (US); Harry Kirk Mathews, Jr., Niskayuna, NY (US); Gabriel de A. Gleizer, Rio de Janeiro (BR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 88 days.

(21) Appl. No.: 14/954,528

(22) Filed: Nov. 30, 2015

(65) Prior Publication Data

US 2017/0151965 A1    Jun. 1, 2017

(51) Int. Cl.
*B61L 23/00* (2006.01)
*B61L 15/00* (2006.01)
*G06Q 10/00* (2012.01)
*B61L 3/00* (2006.01)
*B61L 25/02* (2006.01)

(52) U.S. Cl.
CPC .......... *B61L 15/0081* (2013.01); *B61L 3/006* (2013.01); *B61L 15/0072* (2013.01); *B61L 23/00* (2013.01); *G06Q 10/20* (2013.01); *B61L 25/021* (2013.01); *B61L 25/025* (2013.01)

(58) Field of Classification Search
CPC .......... G06N 7/00; G06F 17/50; B61C 17/12; B60W 20/10; B60W 10/06; B60W 10/08; B60K 6/442; B61L 15/0081; B61L 23/00; B61L 15/0072; G06Q 10/20
See application file for complete search history.

(56) References Cited

U.S. PATENT DOCUMENTS 6,532,825 B1 * 3/2003 Abe .................... G01M 5/0033
                                                        73/799
6,587,764 B2   7/2003 Nickles et al.
(Continued)

OTHER PUBLICATIONS

Zhang et al., "Energy-efficient operation of heavy haul trains in an MPC framework", Intelligent Rail Transportation (ICIRT), 2013 IEEE International Conference on; Aug. 30-Sep. 1, 2013, pp. 105-110 Conference Location: Beijing.
(Continued)

*Primary Examiner* — Aaron L Troost
*Assistant Examiner* — Martin A Weeks
(74) *Attorney, Agent, or Firm* — Pabitra K. Chakrabarti

(57) ABSTRACT

A method and system monitor coupler fatigue by determining an upcoming fatigue metric representative of fatigue that is to be experienced by a coupler configured to connect plural vehicles in a vehicle system, determining whether a failure metric of the coupler during the upcoming trip exceeds a designated failure threshold (where the failure metric is based on the upcoming fatigue metric), and, responsive to determining that the failure metric exceeds the designated failure threshold, one or more of notifying an operator of the upcoming fatigue metric, displaying one or more of the upcoming fatigue metric or the failure metric, changing a driving plan for controlling movement of the vehicle system during the upcoming trip, and/or changing a characteristic of the vehicle system.

20 Claims, 4 Drawing Sheets

(56) References Cited

U.S. PATENT DOCUMENTS

| | | |
|---|---|---|
| 9,002,547 B2 | 4/2015 | Matthews, Jr. et al. |
| 9,002,548 B2 | 4/2015 | Hrdlicka et al. |
| 2004/0068361 A1* | 4/2004 | Cross .................. B61L 27/0077 |
| | | 701/117 |
| 2008/0195265 A1 | 8/2008 | Searle et al. |
| 2008/0269967 A1 | 10/2008 | Kumar et al. |
| 2009/0090818 A1* | 4/2009 | Kumar .................... B61C 15/00 |
| | | 246/186 |
| 2010/0148013 A1 | 6/2010 | Bhotika et al. |
| 2010/0174427 A1 | 7/2010 | Sivasubramaniam et al. |
| 2014/0229149 A1* | 8/2014 | Guan ................. G01N 29/4472 |
| | | 703/2 |

OTHER PUBLICATIONS

Zhong-Liang et al., "Data Transfer and off-board Diagnosis Database for Safety Monitoring of Running Passenger Car", Railway Locomotive & Car, 2006; Issue: 4, pp. 20-23.

* cited by examiner

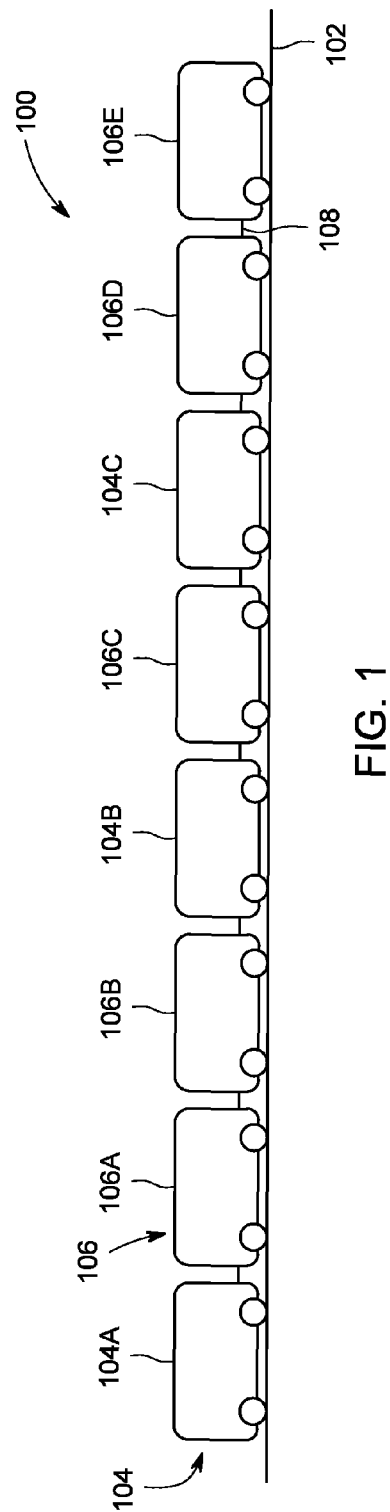
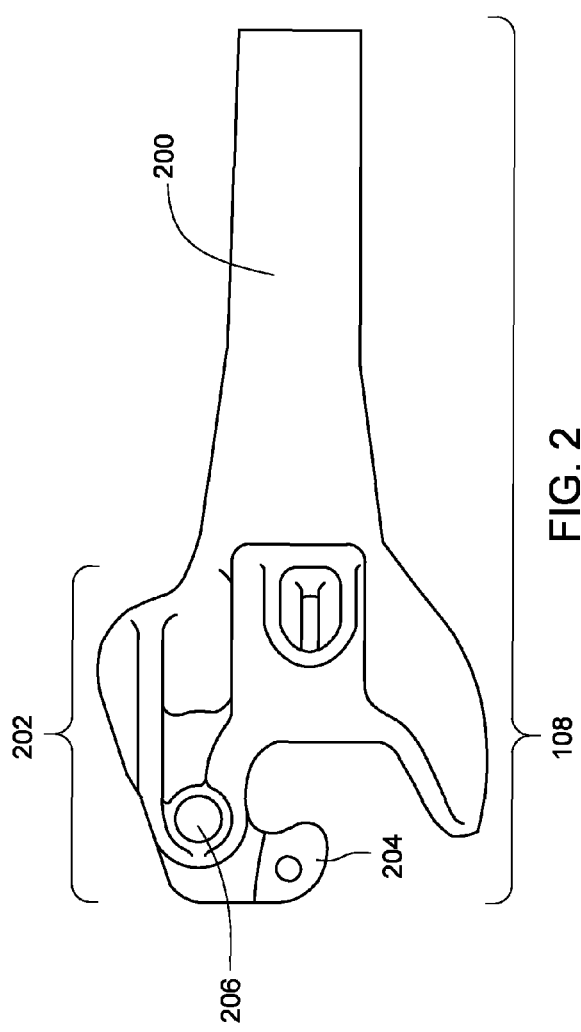

SYSTEM AND METHOD FOR MONITORING COUPLER FATIGUE

FIELD

Embodiments of the subject matter disclosed herein relate to monitoring fatigue and/or service lives of couplers used to mechanically connect vehicles in a vehicle system.

BACKGROUND

Some known vehicle systems include multiple vehicles connected together by couplers so that the vehicles can travel together. Such vehicle systems can be referred to as consists. Some rail vehicle systems can include multiple consists that each includes locomotives (or other powered rail vehicles) providing propulsive force. Other vehicle systems, such as trucks that pull trailers, include couplers that connect the trucks to the trailers. The trucks and the trailers are vehicles in a vehicle system formed from the truck and one or more of the trailers. Another type of vehicle system may be construction equipment that includes cranes or other construction machines to equipment such as buckets used to move earth or other materials. The couplers that connect neighboring vehicles in a vehicle system can flex to allow the vehicle systems to travel over changing grades and curves in a route. Over time, the couplers experience wear and tear from repeated trips of the couplers in one or more different vehicle systems.

Eventually, the wear and tear on the couplers can cause the couplers to fail. A coupler can fail when part of the coupler breaks or is otherwise unable to remain connected with another coupler (to keep neighboring vehicles mechanically coupled). This causes the vehicle system to break into two smaller segments of vehicles.

Currently, little work is done to monitor the couplers in vehicle systems to determine how long the couplers can be used or continue to be used to connect vehicles in the vehicle systems. Some rail operators perform visual inspections of couplers for damage. But, these inspections typically are performed on an ad hoc basis and, as a result, many damaged couplers are not discovered. Other operators simply wait for a coupler to fail before replacing the coupler or a part of the coupler. But, waiting for this type of failure can result in significant cost and downtime for a vehicle system, especially in situations where the coupler fails in a remote location.

BRIEF DESCRIPTION

In one embodiment, a method (e.g., for monitoring coupler fatigue) includes determining an upcoming fatigue metric representative of fatigue that is to be experienced by a coupler configured to connect plural vehicles in a vehicle system, determining whether a failure metric of the coupler during the upcoming trip exceeds a designated failure threshold (where the failure metric is based on the upcoming fatigue metric), and, responsive to determining that the failure metric exceeds the designated failure threshold, one or more of: notifying an operator of the upcoming fatigue metric, displaying one or more of the upcoming fatigue metric or the failure metric, changing a driving plan for controlling movement of the vehicle system during the upcoming trip, and/or changing a characteristic of the vehicle system.

In embodiment, a system (e.g., a coupler monitoring system) includes a controller configured to determine an upcoming fatigue metric that is to be experienced by a coupler configured to connect plural vehicles in a vehicle system. The controller also is configured to determine whether a failure metric of the coupler during the upcoming trip exceeds a designated failure threshold (the failure metric is based on the accumulated fatigue metric). Responsive to determining that the failure metric exceeds the designated failure threshold, the controller is configured to one or more of: notify an operator of the upcoming fatigue metric, display one or more of the upcoming fatigue metric or the failure metric, change a driving plan for controlling movement of the vehicle system during the upcoming trip, and/or direct a change in a characteristic of the vehicle system.

In one embodiment, a method (e.g., for monitoring coupler fatigue) includes determining an accumulated fatigue metric that estimates previously experienced fatigue by a coupler configured to connect plural vehicles in a vehicle system during one or more previous trips of the coupler, determining whether a failure metric of the coupler during an upcoming trip of the vehicle system exceeds a designated failure threshold (where the failure metric is based on the accumulated fatigue metric of the coupler), and, responsive to determining that the failure metric exceeds the designated failure threshold, one or more of notifying an operator of the upcoming fatigue metric, displaying one or more of the accumulated fatigue metric or the failure metric, changing a driving plan for controlling movement of the vehicle system during the upcoming trip, and/or changing a characteristic of the vehicle system.

BRIEF DESCRIPTION OF THE DRAWINGS

Reference is made to the accompanying drawings in which particular embodiments and further benefits of the invention are illustrated as described in more detail in the description below, in which:

FIG. 1 illustrates a schematic diagram of one example of a vehicle system traveling along a route;

FIG. 2 illustrates a coupler shown in FIG. 1 according to one embodiment;

DETAILED DESCRIPTION

Figure 3:
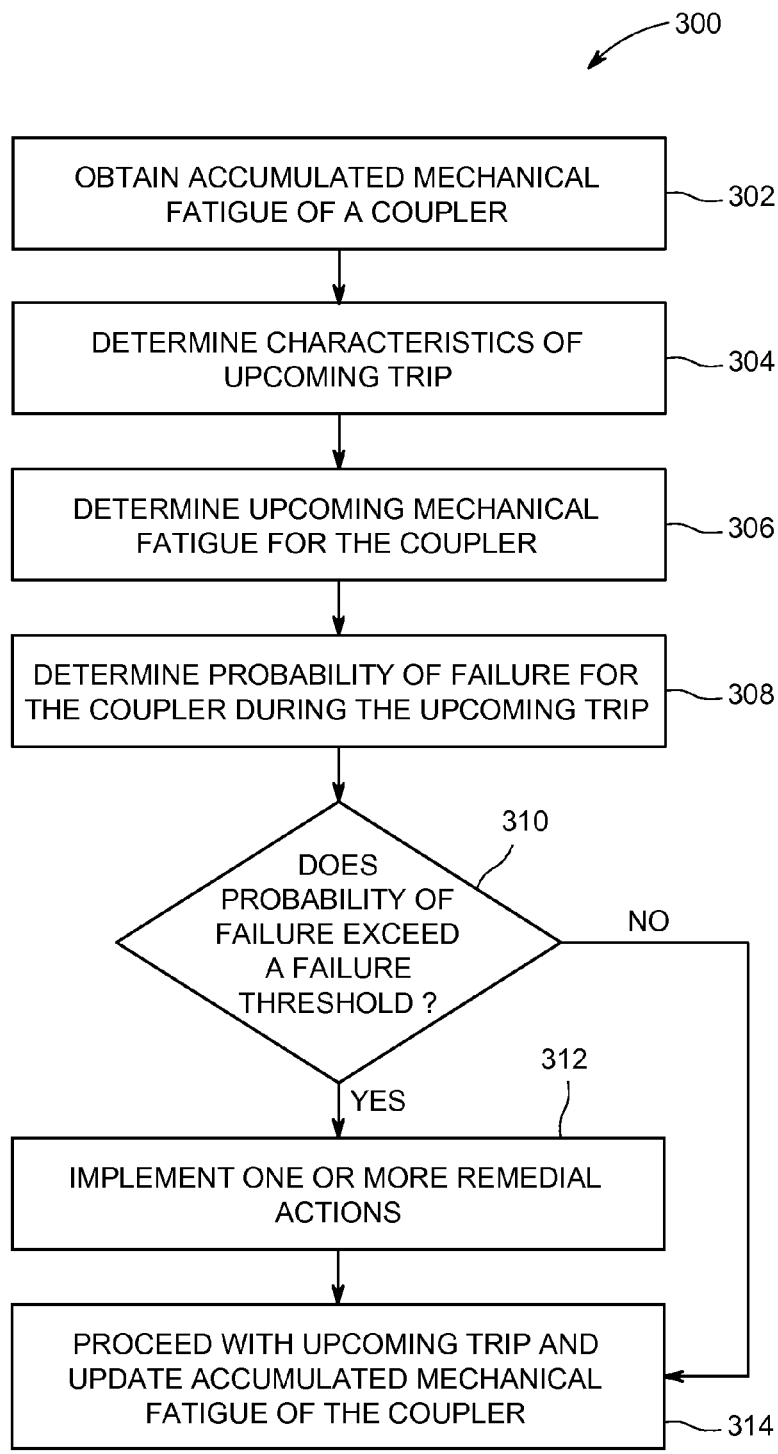
FIG. 3 illustrates a flowchart of one embodiment of a method for monitoring coupler fatigue.

One or more embodiments of the inventive subject matter described herein provides systems and methods for operating vehicle systems and/or generating coupler maintenance recommendations responsive to accumulated coupler fatigue. A database can maintain accumulated fatigue metric for couplers, which may be representative of remaining useful service lives of the couplers. A service life of a coupler can represent how long or how much continued use can be obtained from a coupler before the coupler fails. A remaining useful service life of a coupler can represent how much longer or how much more continued use can be obtained from the coupler before the coupler fails. The accumulated fatigue metric can represent how much wear and tear the coupler has experience from previous uses of the coupler.

Before a trip of a vehicle system that includes couplers, accumulated fatigue metric metrics representative of prior fatigues for the couplers in the vehicle system are obtained and examined from the database. Additional fatigue metrics can be determined that represent fatigues that are expected to be imparted on or experienced by the couplers in the vehicle system during the upcoming trip. These additional fatigues also can be referred to as upcoming fatigue metrics of the couplers. As described herein, the additional fatigue metrics can be determined from the terrain over which the vehicle system is to travel for the upcoming trip, the position of the couplers in the vehicle system, the positions of propulsion-generating vehicles (e.g., locomotives) in the vehicle system relative to the different couplers, the size of the vehicle system (e.g., length and/or weight), the size of various vehicles in the vehicle system, etc.

The accumulated fatigue metric for a coupler and the additional fatigue metric that is expected to be experienced by the coupler for the upcoming trip are examined to determine a failure metric representative of a probability that the coupler will fail during the upcoming trip. If this metric exceeds a threshold, one or more responsive actions may be implemented.

As one example, the operator of the vehicle system may be warned of the likely failure of the coupler during the upcoming trip. If the vehicle system is to be controlled for the upcoming trip according to a driving plan that designates one or more operational settings (e.g., throttle settings, brake settings, speeds, etc.) of the vehicle system as a function of time and/or distance along a route, then the driving plan may be modified. The plan may be modified to reduce the additional fatigue that is expected to be imparted on a coupler and, therefore, to reduce the failure metric of the coupler. Additionally or alternatively, maintenance of the coupler may be automatically scheduled based on the failure metric. This maintenance can be scheduled for a time in the future or for immediate implementation. As another example, the position of the coupler in the vehicle system and/or the positions of one or more vehicles in the vehicle systems may be changed responsive to the failure metric exceeding the threshold. Additionally or alternatively, the range of operational settings that may be used by an operator to manually control the vehicle system during the upcoming trip may be restricted. For example, slower speed limits, a reduce range of throttle settings, etc., may be used to reduce the additional fatigue metric that the coupler is expected to experience.

The threshold to which the failure metric is compared may vary. For example, this threshold may be a function of one or more of the types of vehicles in the vehicle system (e.g., passenger cars versus cars carrying hazardous materials), a type of the vehicle system (e.g., a high priority train versus a manifest train), geographic locations through which the upcoming trip will extend (e.g., rural areas versus populated areas), etc.

During the trip, the accumulated fatigue metric of the couplers may be displayed to an operator onboard the vehicle system (or to an operator that is off-board the vehicle system but that is monitoring the vehicle system). The accumulated fatigue metric of the couplers may be updated based on actual additional fatigue that the couplers are experiencing during the trip so that the operator may be able to track, in real time or as the trip progresses, the accumulated fatigue metric of one or more (or each) of the couplers.

Upon completing the trip, the accumulated fatigue metric experienced by one or more (or each) of the couplers may be updated (e.g., in the database). The accumulated fatigue metric may be updated based on the actual additional fatigue that was experienced by the different couplers during the trip. This updated accumulated fatigue metric may be used to predict potential failure of the couplers in additional upcoming trips for vehicle systems that include one or more of the couplers.

In one aspect of the inventive subject matter described herein, the fatigue metrics for couplers may be used or included in digital twins of the couplers, digital twins of the vehicles to which the couplers are connected, and/or of digital twins of the vehicle systems that include the couplers. A digital twin represents a numerical model of a single specific industrial asset, such as a coupler. The digital twin for a coupler can be formed or created from a large amount of design, manufacture, inspection, repair, online sensor, and operational data and can be used in high-fidelity computational physics-based models and advanced analytics to forecast the health and performance of the coupler over its lifetime, as described herein. The accuracy of the digital twin's representation of a coupler improves over time as more data refines the model of the coupler and similar couplers are deployed with their own digital twin. For example, the accumulated fatigue metric for a coupler may be used to track the health of that particular coupler over time, and the accumulated fatigue metrics for couplers created on or around the same time, at the same manufacturing location, repaired or inspected at the same or similar time, etc., may be used to track the health of the group of couplers and/or to compare the health of any individual coupler with the health of the group of couplers to identify any outliers.

Data can be gathered continually to maintain an up-to-date model of the couplers. The digital twin for a coupler provides detailed knowledge of the coupler, forecasts based on "what if" scenarios and a live reference from which to build applications to optimize services, performance, efficiency, maintenance and more. For example, based on the digital twin for a coupler, the upcoming fatigue that is expected to be exerted on the coupler based on an upcoming trip may be determined to analyze whether the coupler can withstand the upcoming trip. As another example, the digital twin may be used to determine whether a coupler can withstand an upcoming trip but with using different travel scenarios, such as different throttle settings, different brake settings, different vehicles in the vehicle system, different locations of the coupler in the vehicle system, etc., at various locations along the route.

The digital twin can be applied to individual couplers. The digital twin instance can model and track a single specific coupler over the useful lifetime of the coupler. Many digital twin models will have a functional or mathematical form that is the same for similar couplers, but will have tracked parameters and state variables that are specific to each individual coupler. The mathematical form of the underlying model for a coupler can change among the couplers to match the particular configuration or state of each coupler. In this manner, the digital twin can be different from fleet-level modelling.

The digital twin model of a coupler can be updated as the coupler is operated. At any moment, the digital twin represents a faithful representation of the current state of the coupler. The output of the model changes with every trip, with every fuel burn hour, etc. This might be a result of updating the latent model parameters, or the model might incorporate the new information into the output of the model (but remain the same underlying model). The digital twin model is scalable. Benefit is derived when hundreds or thousands of couplers have a digital twin. A digital twin of a single coupler can include information from some or all of the other couplers.

FIG. 1 illustrates a schematic diagram of one example of a vehicle system 100 traveling along a route 102. The vehicle system 100 includes several vehicles 104, 106 operably coupled with each other. The vehicles may be mechanically coupled with each other, such as by couplers 108. Two vehicles 104 and/or 106 may be directly connected with each other when no other vehicle 104 or 106 is disposed between the directly connected vehicles 104 and/or 106. Two vehicles 104 and/or 106 may be indirectly connected or interconnected with each other when one or more other vehicles 104 and/or 106 are disposed between and connected with the interconnected vehicles 104 and/or 106.

The vehicles 104 (e.g., vehicles 104A-C) represent propulsion-generating vehicles, such as vehicles capable of generating propulsive force to propel the vehicle system 100 along the route 102. Examples of propulsion-generating vehicles 104 include locomotives, other off-highway vehicles (e.g., vehicles that are not designed for or permitted to travel on public roadways), automobiles (e.g., vehicles that are designed for traveling on public roadways), marine vessels, and the like. In one embodiment, the vehicles 104 represent locomotives and the vehicles 106 represent rail cars. The vehicles 104 may be fuel-powered vehicles (e.g., engines that consume fuel are used to generate propulsive force by creating electric current to power motors or to rotate axles and wheels), electric-powered vehicles (e.g., onboard or off board sources of electric current are used to power motors to generate propulsive force), and/or hybrid powered vehicles (e.g., vehicles that are powered by fuel-consuming engines and other sources of electric current). The vehicles 106 (e.g., vehicles 106A-E) represent non-propulsion-generating vehicles, such as rail cars or other units that are propelled along the route 102 by the propulsion-generating vehicles 104.

The term "vehicle" as used herein can be defined as a mobile machine that transports at least one of a person, people, or a cargo. For instance, a vehicle can be, but is not limited to being, a rail car, an intermodal container, a locomotive, a marine vessel, mining equipment, construction equipment, an automobile, and the like. A "vehicle system" includes two or more vehicles that are interconnected with each other to travel along a route. For example, a vehicle system can include two or more vehicles that are directly connected to each other (e.g., by a coupler) or that are indirectly connected with each other (e.g., by one or more other vehicles and couplers). A vehicle system can be referred to as a consist, such as a rail vehicle consist.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. "Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory", as used herein, refers to a storage device configured to store digital data or information which can be retrieved by a computer or processing element. "Controller," "unit," and/or "module," as used herein, can to the logic circuitry and/or processing elements and associated software or program involved in controlling an energy storage system. The terms "signal", "data", and "information" may be used interchangeably herein and may refer to digital or analog forms.

At least one technical effect described herein includes tracking fatigue metrics (e.g., quantifiable amounts of wear and tear), predicting additional fatigue metrics that are to be exerted on the couplers for an upcoming trip, determining whether the risk of failure of a coupler is too high due to the fatigue metric of the coupler, and, if the risk is too high, changing or limiting how a vehicle system is controlled to prevent coupler failure, replacing the coupler, repairing the coupler, or changing the makeup of the vehicle system to prevent coupler failure.

While the vehicle system 100 is shown in FIG. 1 as a train, alternatively, the vehicle system 100 may represent another vehicle system formed of vehicles other than locomotives (e.g., the propulsion-generating vehicles 104) and railcars (e.g., the non-propulsion generating vehicles 106). For example, the vehicle system 100 may represent several automobiles, marine vessels, off-highway vehicles other than rail vehicles, or the like, joined together to travel along the route 102.

In one embodiment, tractive efforts (e.g., power output, horsepower, speed, and the like) and/or braking efforts of the vehicle system 100 may be controlled to drive the vehicle system 100 along the route 102 from an origin geographic location to a destination geographic location. The tractive and/or braking efforts may be automatically controlled such that the tractive and/or braking efforts provided by the vehicles 104, 106 without operator intervention involved in changing these efforts. Alternatively or additionally, the vehicle system 100 may provide prompts and notices to an operator that direct the operator how to manually control the efforts of the vehicle system 100. For example, the system 100 may provide prompts to an operator to instruct the operator of which operational settings to use at a current time and/or which settings to use at upcoming times when the system 100 arrives at one or more upcoming geographic locations. The operational settings (e.g., settings that control tractive effort, braking effort, etc.) of the propulsion-generating vehicles and/or non-propulsion-generating vehicles may be referred to herein as operational parameters.

The tractive efforts and braking efforts may be controlled by designating operational settings of the vehicle system 100 at one or more geographic locations along the route 102. By way of example, these operational settings can include power settings (e.g., throttle notch settings) that control the power output from the propulsion-generating vehicles 104, brake settings (e.g., dynamic brake settings) that control the braking efforts of the propulsion-generating vehicles 104 and/or the non-propulsion generating vehicles 106, and/or speeds of the vehicle system 100. The operational settings that are designated for a trip of the vehicle system 100 from a first geographic location to a different, second geographic location along the route 102 may be referred to as a driving plan or a trip plan of the vehicle system. The designated operational settings can be expressed as a function of time elapsed during a trip along the route 102 and/or distance along the route 102 in the trip.

FIG. 2 illustrates one of the couplers 108 shown in FIG. 1 according to one embodiment. The coupler 108 includes an elongated shank 200 that is connected with a knuckle device 202. The knuckle device 202 includes a knuckle 204 that pivots about a knuckle pin 206. In operation, the knuckle 204 of one coupler 108 can pivot to engage or mesh with the knuckle device 202 of another coupler 108. For example, two vehicles 104 and/or 106 may have ends that face each other, with each of these ends including one of the couplers 108. The knuckle devices 202 for the couplers 108 that extend toward and face each other may engage to connect the vehicles 104 and/or 106 with each other.

FIG. 3 illustrates a flowchart of one embodiment of a method 300 for monitoring coupler fatigue. The method 300 may be used by one or more of the systems described herein (or another system) to track fatigue and/or service lives of couplers, and/or to change how a vehicle system is controlled, to change the makeup of a vehicle system, and/or to order maintenance of couplers to avoid or reduce coupler failure in a vehicle system during a trip of the vehicle system. In one embodiment, the operations described in connection with the method 300 may represent or be used to generate computer software code to control operation of one or more embodiments of the systems described herein. The method 300 is described in connection with monitoring the fatigue of a single coupler, but may be applied to monitor the fatigue metrics of several couplers. For example, the method 300 may be repeated so that the fatigue metrics of multiple couplers are tracked.

At 302, an accumulated fatigue metric of a coupler is obtained. The accumulated fatigue metric of the coupler represents the amount of wear and tear (or mechanical damage) already experienced by the coupler, and can represent the amount of remaining useful service life of the coupler. The accumulated fatigue metric can be expressed as a numerical value indicative of the amount of wear and tear (or damage) experienced by the coupler, and/or a numerical value indicative of a remaining useful service life of the coupler.

The couplers may be identified in order to assist in tracking the fatigue metrics of the couplers over time. For example, the couplers may have unique identifiers printed on the couplers (e.g., serial numbers, bar codes, etc.) and/or the couplers may be connected with tags or other identifying devices (e.g., RFID tags). The couplers may be identified based on which vehicle the couplers are connected with. For example, rail cars may be have unique identifiers, and the couplers may be identified by determining which rail car the couplers are connected with.

The accumulated fatigue metric accumulated fatigue metric for a coupler may be based on one or more characteristics. In one embodiment, the accumulated fatigue metric of the coupler is a function of a number of force cycles previously experienced by the coupler and/or magnitudes of the force cycles. The force cycles represent changes in forces previously exerted on the coupler.

Figure 4:
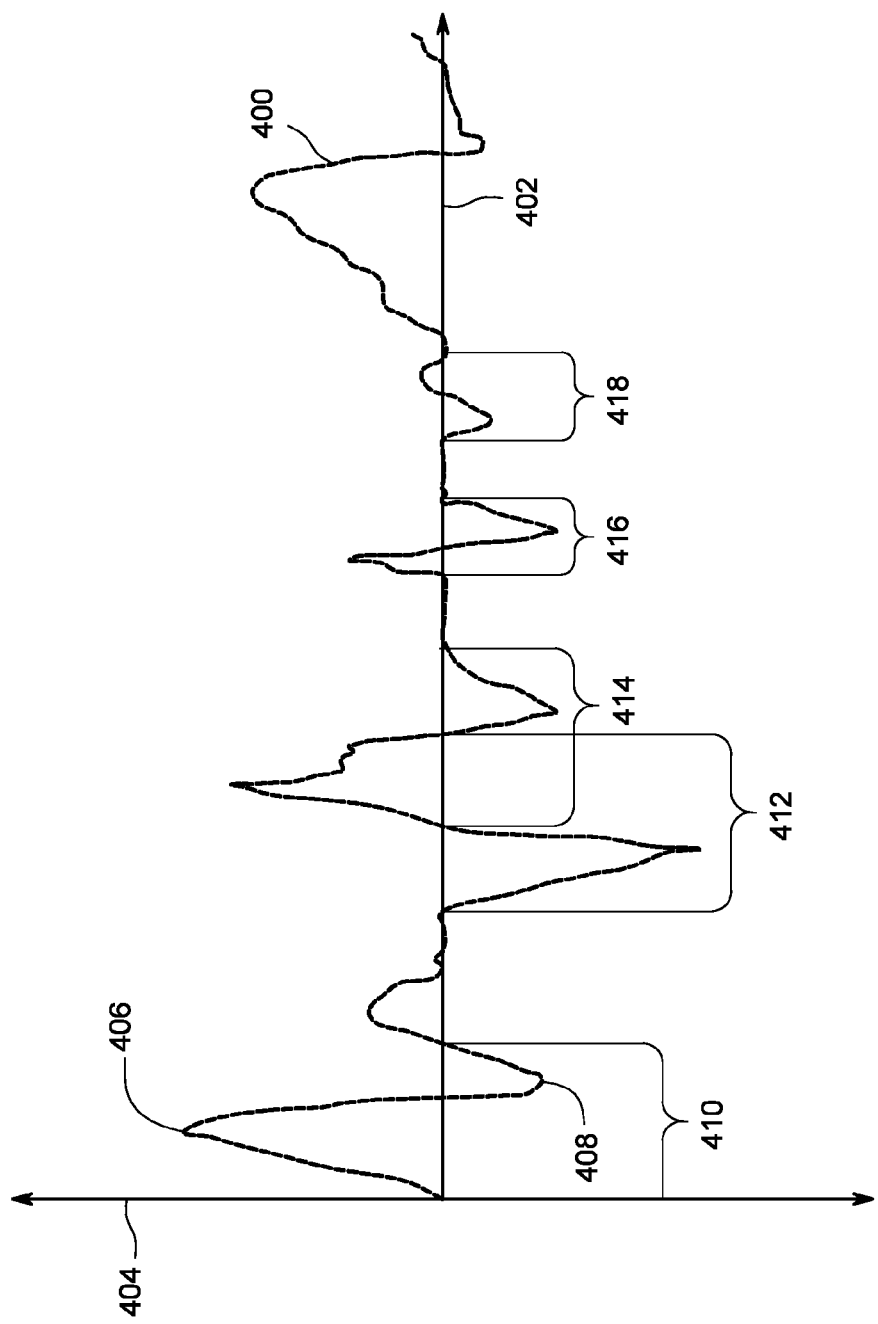
FIG. 4 illustrates forces imparted on a coupler shown in FIG. 1 according to one example.

FIG. 4 illustrates forces 400 imparted on a coupler 108 shown in FIG. 1 according to one example. The forces 400 can represent the compressive and tensile forces experienced by the coupler 108 during one or more previous trips in the same or different vehicle systems. The forces 400 are shown alongside a horizontal axis 402 representative of time or distance along a route, and are shown alongside a vertical axis 404 representative of magnitudes of the forces 400 exerted on the coupler 108. The forces 400 extending above the horizontal axis 402 represent tensile forces exerted on the coupler 108 and the forces 400 extending below the horizontal axis 402 represent compressive forces exerted on the coupler 108.

The forces 400 include several peaks 402, 404, which include both positive force peaks 406 (e.g., times or locations of larger tensile forces than other times or locations) and negative force peaks 408 (e.g., times or locations of larger compressive forces than other times or locations). In one embodiment, a force cycle represents the forces 400 exerted on the coupler that extend between or include both a positive peak 406 and a negative peak 408. In FIG. 4, several force cycles 410, 412, 414, 416, 418 are illustrated. Each of these force cycles includes both a positive peak and a negative peak. In one embodiment, a force cycle may be defined by a positive peak followed by a negative peak or a negative peak followed by a positive peak. Additionally or alternatively, a force cycle may be defined by a positive peak followed by a negative peak with no other positive peak between the positive and negative peaks, or a negative peak followed by a positive peak with no other negative peak between the negative and positive peaks. Alternatively, a force cycle may be defined by a positive peak or a negative peak alone. In another embodiment, a force cycle may be defined by a zero crossing, or an instance of the forces transitioning from a positive tensile force to a negative compressive force. Alternatively, a force cycle may be defined by another change in the forces imparted on a coupler.

A magnitude of a force cycle may represent a difference between the value of the positive peak force and the negative peak force within the cycle. For example, the magnitude may be a sum of the magnitude at the positive peak and the absolute value of the magnitude at the negative peak. Alternatively, the magnitude of a force cycle may represent an average value of the positive peak and the absolute value of the negative peak. As another example, the magnitude of a force cycle may represent an average or median of the magnitudes of the positive peaks, an average or median of the magnitudes of the negative peaks, a sum of the average or median of the magnitudes of the positive peaks, a sum of the average or median of the magnitudes of the negative peaks, and/or a sum of the average or median of the magnitudes of the positive peaks and the absolute value of the average or median of the magnitudes of the negative peaks. Alternatively, the magnitude of the force cycles may be expressed in another manner indicative of the wear and tear on the coupler.

The forces 400 may be determined from a model of the vehicle system. Such a model can include one or more physics-based mathematical relationships or equations that estimate the forces exerted on the couplers based on various inputs. Examples of models that may be used include a rope model of the vehicle system or a dynamic model of the vehicle system. A rigid rope model of the vehicle system treats the vehicle system as having no slack between the vehicles. The terrain (e.g., grades and/or curvature) that the vehicle system is to travel over or is traveling over may be used to estimate the amount of compression or tension between neighboring vehicles in the vehicle system. Based on this estimate, the forces exerted on the coupler between the vehicles can be determined. Additionally or alternatively, the forces may be measured by one or more sensors. The sensors can include strain sensors that measure mechanical strains of couplers, and the forces exerted on the couplers may be estimated from the strains. The sensors may include distance sensors (e.g., optical sensors, radar sensors, etc.) that measure distances between neighboring vehicles. As the distance decreases, the compressive force exerted on a coupler between the vehicles increases and, as the distance increases, the tensile force exerted on the coupler increases. The forces may be estimated based on one or more previous trips of the vehicle system. For example, based on a previous trip of a vehicle system over a route where the forces exerted on the sensors were measured or estimated, the forces exerted on the vehicle system for an upcoming trip may be determined.

The forces exerted on the couplers may be measured or calculated prior to an upcoming trip of a vehicle system based on the terrain, masses of the vehicles, etc. Additionally or alternatively, the forces may be measured or calculated during movement of the vehicle system along the route.

Returning to the description of the method 300 shown in FIG. 3, the accumulated fatigue metric for a coupler may be defined by determining how many force cycles the coupler has experienced and/or the magnitude of the force cycles. The number of force cycles may be determined by counting the number of force cycles previously experienced by the coupler during one or more (or all) previous trips of a vehicle system that included the coupler. The magnitude of the force cycles may be determined as described above. The accumulated fatigue metric may be a numerical value that is based on the number and/or magnitude of the force cycles. For example, the value of the accumulated fatigue metric may be larger for couplers that experience more force cycles with larger magnitudes than for couplers having a smaller number of force cycles and/or force cycles with smaller magnitudes. The value of the accumulated fatigue metric may be larger for couplers that experience more force cycles than for couplers having a smaller number of force cycles, but with the same magnitudes of the force cycles. The value of the accumulated fatigue metric may be larger for couplers that experience force cycles having larger magnitudes than for couplers having the same number of force cycles, but with smaller magnitudes.

Additionally or alternatively, the accumulated fatigue metric for a coupler may be based on (e.g., may be a function of) a distance previously traveled by the coupler. For example, the total sum distance traveled by vehicle systems having the coupler connect vehicles in the vehicle systems may represent the accumulated fatigue metric for a coupler, with couplers having longer total traveled distances associated with greater accumulated fatigue metrics than couplers that have traveled shorter total distances. Additionally or alternatively, the accumulated fatigue metric for a coupler may be based on (e.g., a function of) one or more characteristics of terrain over which the coupler previously traveled. For example, the accumulated fatigue metric may be based on (e.g., a function of) the steepness of grades, radii of curvature, numbers and/or severity of changes in grade, numbers and/or severity of changes in curvature, etc., of routes that the vehicle systems in which the coupler was disposed (to connect vehicles) previously traveled. The couplers that have traveled over routes with steeper grades, tighter radii of curvature, larger numbers of changes in grade, greater severity of changes in grade (e.g., the degree at which the grade in a route changes from uphill to downhill or vice-versa), larger numbers of changes in curvature, and/or greater severity of changes in curvature (e.g., the degree at which the curvature in a route changes from curving left to curving right or vice-versa) may have larger accumulated fatigue metrics than other couplers.

Additionally or alternatively, the accumulated fatigue metric may be based on (e.g., a function of) one or more characteristics of the vehicle system or systems in which the coupler previously traveled. These characteristics can include the sizes (e.g., weight and/or length) of the vehicle systems, the number and/or in-vehicle system position of propulsion-generating vehicles 104 in the vehicle systems, etc. For example, couplers that have been used in longer and/or heavier vehicle systems may have greater accumulated fatigue metrics than couplers used in shorter and/or lighter vehicle systems. Couplers that have been used in vehicle systems having a smaller number of vehicles 104 may have greater accumulated fatigue metrics than couplers used in vehicle systems having a larger number of vehicles 104. Couplers that have been located closer to vehicles 104 in vehicle systems than other couplers may have greater accumulated fatigue metrics than the other couplers.

Additionally or alternatively, the accumulated fatigue metric may be based on (e.g., a function of) where the coupler was located in the vehicle system(s) in which the coupler previously traveled. For example, the fatigue accumulated for a first coupler located in a vehicle system closer to a leading end or a trailing end of a vehicle system may be larger than the fatigue accumulated for a second coupler that is located closer to the middle of the vehicle system for a trip of the vehicle system. Depending on where a coupler is located in different vehicle systems during different trips, the accumulated fatigue metric may vary. For example, couplers that are used more often at in-vehicle system positions closer to the middle of vehicle systems may have smaller accumulated fatigue metrics than couplers that are used more often closer to the ends of vehicle systems.

At 304, one or more characteristics of an upcoming trip of a vehicle system that will include the coupler (being investigated or examined) are determined. These characteristics can include features of the upcoming trip that will change (e.g., increase) the accumulated fatigue metric of the coupler. These characteristics can be referred to as trip characteristics. In one embodiment, the trip characteristics include a distance to be traveled by the coupler or vehicle system during the upcoming trip, one or more characteristics of terrain over which the coupler will travel during the upcoming trip (e.g., route characteristics), one or more characteristics of the vehicle system in which the coupler will travel during the upcoming trip (e.g., vehicle characteristics), and/or an in-vehicle system position of the coupler in the vehicle system in which the coupler will travel during the upcoming trip. Alternatively, another characteristic of the upcoming trip that is indicative of how much additional fatigue metric the coupler is likely to experience during the upcoming trip may be determined. These characteristics can be obtained from a driving plan or trip plan of the upcoming trip, from a manifest of the vehicle system or the trip, from input provided by an operator of the vehicle system, or from other sources.

At 306, upcoming metric for the coupler is determined. The upcoming fatigue metric may represent an amount of additional fatigue that the coupler is expected to experience due to the upcoming trip. The upcoming fatigue metric may be a predicted amount of additional wear and tear on the coupler that is estimated from the one or more characteristics of the upcoming trip. In one aspect, the upcoming fatigue metric can be determined based on (e.g., a function of) a number of force cycles to be experienced by the coupler during the upcoming trip and/or magnitudes of one or more of the force cycles to be experienced by the coupler during the upcoming trip. The forces that will be imparted on the coupler may be the natural forces described above that can be calculated from characteristics of the route and/or vehicle system for the upcoming trip. Additionally or alternatively, the upcoming fatigue metric can be determined based on (e.g., a function of) the distance to be traveled by the coupler during the upcoming trip. Additionally or alternatively, the upcoming fatigue metric can be determined based on (e.g., a function of) the route characteristics and/or the vehicle characteristics for the upcoming trip. The upcoming fatigue metric additionally or alternatively may be determined based on (e.g., a function of) the in-vehicle system position of the coupler in the vehicle system in which the coupler will travel during the upcoming trip.

In one embodiment, the upcoming fatigue metric for a coupler can be determined by obtaining the accumulated fatigue metric experienced by one or more of the same coupler or another coupler from one or more previous trips. The upcoming fatigue metric may be the same as or based on the accumulated fatigue metric from the previous trip(s). For example, the size of the vehicle system in the previous trip(s) and/or the in-vehicle system position of the same coupler or the other coupler in the vehicle system in the previous trip(s) can be determined, and the accumulated fatigue metric experienced by the coupler or other coupler during the previous trip(s) can be scaled to determine the upcoming fatigue metric for the coupler. The scaling of the accumulated fatigue metric can involve determining the proportion or ratio of the size of the vehicle system and/or the in-vehicle system position of the coupler in the upcoming trip to the size of the vehicle system and/or the in-vehicle system position of the coupler in the previous trip(s), and multiplying the accumulated fatigue metric from the previous trip(s) by the proportion or ratio. For example, if the size of the vehicle system in the upcoming trip is twice as large as the vehicle system in the previous trip(s), then the accumulated fatigue metric from the previous trip(s) may be multiplied by two (or another number) to determine the upcoming fatigue metric. As another example, if the coupler is located three times closer to the middle of the vehicle system in the upcoming trip than in the previous trip(s) (e.g., the coupler is three times closer to the middle than the leading or trailing end), then the accumulated fatigue metric from the previous trip(s) may be multiplied by one third (or another number, due to the fatigue being less closer to the middle of a vehicle system than the ends) to determine the upcoming fatigue metric.

The upcoming fatigue metric additionally or alternatively may be determined based on (e.g., a function of) a number of expected run-ins between the vehicles connected by the coupler and/or a number of expected run-outs between the vehicles connected by the coupler. A run-in between the vehicles connected by the coupler can include the vehicles moving toward each other and compressing the coupler between the vehicles over a short time period (e.g., over a time period of a few seconds or less, where the vehicles would collide but for the presence of the couplers between the vehicles). Additionally or alternatively, a run-in may occur when the compressive force exerted on a coupler exceeds a designated threshold, such as 70%, 80%, 90%, 100%, or the like, of a maximum amount of compressive force that the coupler is rated to withstand by the manufacturer of the coupler. A run-out between the vehicles connected by the coupler can include the vehicles moving away from each other and pulling the coupler the vehicles over a short time period (e.g., over a time period of a few seconds or less). Additionally or alternatively, a run-out may occur when the tensile force exerted on a coupler exceeds a designated threshold, such as 70%, 80%, 90%, 100%, or the like, of a maximum amount of tensile force that the coupler is rated to withstand by the manufacturer of the coupler.

At 308, a failure metric for the coupler during the upcoming trip is determined. The failure metric can represent a percentage, fraction, or other number indicative of a likelihood that the coupler will fail and cause the vehicle system to separate into two or more segments during the upcoming trip. The failure metric can be based on (e.g., can be a function of) the accumulated fatigue metric and the upcoming fatigue metric of the coupler. As a sum of the accumulated fatigue metric and the upcoming fatigue metric of the coupler increases, the failure metric also can increase. Conversely, for smaller accumulated fatigue metrics and/or upcoming fatigue metrics, the failure metric can be smaller.

In one embodiment, the failure metric can represent a remaining useful service life of the coupler. As the accumulated fatigue metric of a coupler increases, the remaining useful service life of the coupler may decrease. The incorporation of the upcoming fatigue metric into the accumulated fatigue metric may indicate that the remaining useful service life of the coupler will be insufficient to complete the upcoming trip without the coupler failing. As the accumulated fatigue metric and the upcoming fatigue metric for the coupler increases, the remaining useful service life of the coupler decreases. As the remaining useful service life of the coupler decreases, the probability that the coupler will fail during the upcoming trip increases. The failure metric of the coupler can be calculated as a percentage, fraction, or other numerical value. Alternatively, the failure metric can be calculated as a time period (e.g., a remaining useful service life of the coupler), a number and/or magnitude of additional force cycles (that the coupler can withstand before failure), or in another manner.

At 310, a determination is made as to whether the failure metric of the coupler exceeds a failure threshold. In one aspect, the failure threshold is a designated, non-zero threshold. The threshold can have a variety of values that can be selected by an operator of a system performing the method 300, such as 0.1%, 0.5%, 1%, 3%, 5%, or another value. If the failure metric of a coupler exceeds the threshold, then the coupler is likely to fail during the upcoming trip of the vehicle system. As a result, flow of the method 300 can proceed toward 312. If the failure metric does not exceed the threshold, then the coupler is likely to complete the upcoming trip of the vehicle system without failing. As a result, flow of the method 300 can proceed toward 314.

In one embodiment, the designated failure threshold can change or be determined based on (e.g., a function of) one or more vehicle characteristics and/or route characteristics. For example, the failure threshold may be calculated as a function of a type of one or more of the vehicles in the vehicle system for the upcoming trip. Different types of vehicles may carry different types of cargo. For example, passenger vehicles may carry one or more humans, oil cars may carry liquid oil, hazmat cars may carry one or more hazardous materials, flat bed cars may carry timber, machinery, etc., and the like. Depending on the types of vehicles in the vehicle system, the failure threshold may need to be lower to ensure that no couplers break during the upcoming trip. For example, a vehicle system for an upcoming trip that includes one or more vehicles carrying explosive, flammable, or other hazardous materials may have a smaller failure threshold relative to a vehicle system for the same upcoming trip that does not include the one or more vehicles carrying explosive, flammable, or other hazardous materials. The smaller failure threshold can result in only those couplers with smaller accumulated and upcoming fatigue metrics (and, correspondingly, lower failure metrics) being acceptable for use in the upcoming trip.

As another example, the failure threshold can be calculated based on (e.g., a function of) one or more locations (e.g., geographic areas) of a route over which the upcoming trip extends. The route for an upcoming trip may extend through one or more different types of geographic areas.

These areas may have different risks for damage if a coupler breaks during travel of the vehicle system in the corresponding area. For example, a coupler that breaks and separates a vehicle system into two segments in a heavily populated urban area poses a greater risk to property damage and/or bodily harm than a coupler that breaks during travel in a rural or sparsely populated area, which posts a greater risk than a coupler that breaks in an unpopulated area (e.g., the desert). Therefore, the failure threshold may be smaller for upcoming trips on routes that extend through more heavily populated areas than for trips on routes that extend through less densely populated areas.

As another example, the failure threshold can be calculated based on (e.g., a function of) a priority of the vehicle system during the upcoming trip relative to one or more other vehicle systems. Priorities of vehicle systems can be used by an off-board location (e.g., a dispatch or scheduling facility) to determine which vehicle system of several vehicle systems can travel before other vehicle systems on a segment of a route. For example, for rail vehicles traveling on single tracks, only a single rail vehicle may be able to travel along a segment of the track at a time. The rail vehicles with higher priorities are allowed or scheduled to travel on that segment before or in place of other rail vehicles with lower priorities. Rail vehicles that are manifest vehicle systems may have lower priorities than other rail vehicles. The priorities may be designated in trip manifests of the vehicle systems, be designated by dispatch or scheduling facilities, based on the type of cargo being carried (e.g., hazardous versus non-hazardous cargo), or other factors.

The value of the failure threshold can be smaller for vehicle systems having greater priorities than other vehicle systems. For example, high priority vehicle systems may be associated with lower failure thresholds to avoid or reduce the potential for couplers breaking during the upcoming trip relative to lower priority vehicle systems.

At 312, one or more responsive actions are implemented responsive to the failure metric of the coupler exceeding the failure threshold. In one embodiment, a warning signal may be generated to cause an output device to present a warning to an operator onboard the vehicle system. For example, a display device, acoustic speaker, or the like, may inform the operator that the coupler is likely to fail during the upcoming trip. Additionally or alternatively, the warning signal may be generated to cause an output device to present a warning to another person, such as an operator of a dispatch or scheduling facility that is off-board the vehicle system. In addition to or in place of warning the operator or another person, the operator or other person may be notified of one or more of the accumulated fatigue metric, the upcoming fatigue metric, or the probability of the failure. Such a notification can occur by displaying or otherwise presenting this information to the operator or other person.

In another example, a driving plan for the vehicle system may be modified responsive to the failure metric of the coupler exceeding the failure threshold. The driving plan additionally or alternatively can be referred to as a trip plan, and can designate operational settings of the vehicle system for the upcoming trip as a function of time and/or distance along the route. For example, the driving plan can dictate the throttle settings, brake settings, speeds, or the like, of the vehicle system for different locations along the route of the trip and/or for different times during the trip. In one embodiment, the driving plan may be created to reduce fuel consumption, reduce emission generation, reduce forces exerted on couplers, and/or improve handling of the vehicle system relative to the same vehicle system traveling along the same route for the same upcoming trip, but using different operational settings (e.g., the vehicle system traveling at the speed limit, or track speed, for the entire trip).

In order to prevent the coupler from breaking during the upcoming trip, the driving plan may be changed. One or more of the operational settings designated by the driving plan may be modified. Changing the operational settings of the driving plan can reduce the upcoming fatigue metric that is expected to be imparted on the coupler. For example, reducing a speed at which the vehicle system travels through a curve, increasing the power output from the trailing propulsion-generating vehicle 104C (shown in FIG. 1) during travel over an uphill grade, applying the brakes in the leading propulsion-generating vehicle 104A (also shown in FIG. 1) during travel down a downhill grade, or the like, can decrease the wear and tear that is expected to be imparted on the coupler during the upcoming trip. The driving plan may be modified to reduce the upcoming fatigue metric for the coupler. In one embodiment, the method 300 may be repeated with the updated driving plan to check and see if the new driving plan results in the same coupler or another coupler having a failure probability that exceeds the failure threshold.

In one embodiment, the driving plan may be updated by changing positions of virtual fences between the propulsion-generating vehicles 104 in the vehicle system for the upcoming trip. A virtual fence represents a division along the length of the vehicle system that divides the propulsion-generating vehicles into different groups. The propulsion-generating vehicles within the same group (or between the same two virtual fences) may be controlled using the same operational setting at the same time. A driving plan may designate different groups of the propulsion-generating vehicles at different locations and/or times. As a result, the vehicles 104A, 104B may be in a first group and operate using the same throttle setting and the vehicle 104C may simultaneously be in a different, second group and operate using a different throttle setting. At a different time and/or location along the route, the driving plan may designate that the vehicle 104A be in one group and the vehicles 104B, 104C be in another group (with corresponding different operational settings). Such a driving plan may be modified to reduce the upcoming fatigue metric and failure metric of a coupler by changing which vehicles 104 are grouped together at different times or locations along the route (or by moving the virtual fences at different times or locations along the route).

Additionally or alternatively, one or more of the vehicles in the vehicle system may be removed from the vehicle system for the upcoming trip responsive to determining that the failure metric exceeds the failure threshold. The vehicle or vehicles that are removed may include at least one vehicle that is connected with the coupler associated with the failure metric. Additionally or alternatively, the vehicle or vehicles that are removed may include at least one vehicle that has another coupler that is connected with the coupler associated with the failure metric. As another example, one or more vehicles that are not connected with the coupler associated with the failure metric may be removed from the vehicle system. For example, a heavier vehicle 106 that is several vehicles behind the coupler associated with the failure metric may be removed from the vehicle system to reduce the upcoming fatigue metric that is expected to be imparted on the coupler.

The in-vehicle system position of one or more vehicles in the vehicle system may be changed for the upcoming trip responsive to determining that the failure metric exceeds the failure threshold. The vehicle or vehicles that are moved within the vehicle system may include at least one vehicle that is connected with the coupler associated with the failure metric, at least one vehicle that has another coupler that is connected with the coupler associated with the failure metric, or one or more vehicles that are not connected with the coupler associated with the failure metric. For example, the in-vehicle system position of a propulsion-generating vehicle may be switched to be closer or farther from the coupler in order to reduce the upcoming fatigue metric that is expected to be imparted on the coupler. The in-vehicle system position of a cargo vehicle (e.g., a vehicle 106) may be changed or switched with another vehicle 104 or vehicle 106 in order to reduce the upcoming fatigue metric that is expected to be imparted on the coupler.

Additionally or alternatively, the coupler associated with the failure metric may be modified responsive to determining that the failure metric exceeds the failure threshold. For example, the knuckle device, the knuckle, the knuckle pin, or the shaft of the coupler may be replaced with another knuckle device, knuckle, knuckle pin, or shaft. Alternatively, the entire coupler may be replaced with another coupler. Additionally or alternatively, the coupler may be moved to another position in the vehicle system, or swapped with another coupler. Replacing part or all of the coupler can reduce the accumulated fatigue metric associated with the coupler and thereby reduce the failure metric for that coupler.

An updated accumulated fatigue metric of the coupler may be determined by incorporating the upcoming fatigue metric (e.g., determined at 306) into the accumulated fatigue metric (e.g., obtained at 302). This incorporation can involve combining the metrics, such as by adding the metrics, multiplying the metrics, or the like. Inspection, maintenance, and/or repair of the coupler may be automatically scheduled or manually scheduled at a time that is a function of or otherwise based on the updated accumulated fatigue metric. For example, for larger values of the updated accumulated fatigue metric, the method 300 may automatically schedule inspection, maintenance, and/or repair of the coupler at an earlier date than for smaller values of the updated accumulated fatigue metric. In one aspect, the driving plan may be updated (as described above) by starting the upcoming trip with the coupler associated with the failure probability, but by scheduling the inspection, repair, and/or maintenance of the coupler at a location along the route in the trip.

One or more restrictions on manual control of the vehicle system may be implemented responsive to determining that the failure metric of the coupler exceeds the failure threshold. Prior to implementing any such restrictions, an operator of the vehicle system may manually change operational settings of the vehicle system within an allowable range. This allowable range may be a maximum allowable range. For example, for a throttle of a locomotive, the allowable range prior to the restrictions may be moving the throttle between a zero position (where no tractive effort is generated) to an eighth position (where maximum tractive effort is generated). A gas pedal of an automobile may be moved from a non-depressed position to a fully depressed position. A brake lever or pedal similarly may be moved between or among a variety of positions.

The restrictions that are implemented responsive to the failure probability exceeding the failure threshold may limit the allowable range of throttle settings, brake settings, speeds, or other settings of the vehicle system. For example, instead of allowing an operator to move the throttle between the zero and eighth positions, the vehicle system may only permit the throttle to be moved between the zero and fourth positions for one or more locations along the route. As another example, instead of allowing an operator to depress the gas pedal all the way to the floor, the vehicle system may only permit the pedal to be depressed half way toward the floor. As another example, the vehicle system may not speed up above a speed limit that is slower than a designated speed limit for the route. Alternatively, the vehicle system may allow the operator to change the operational settings within the maximum allowable range, but may ignore those changes that fall outside of the implemented restrictions. The restrictions may be implemented to reduce the upcoming fatigue metric that is expected to be imparted on the coupler (and therefore reduce the failure probability of the coupler).

In one embodiment, the cost or impact of different responsive actions may be compared to determine which responsive action to implement. For example, replacing or moving the coupler, moving a vehicle in the vehicle system, changing the driving plan, or scheduling inspection, repair, or maintenance of the coupler as responsive actions in response to determining that the failure metric exceeds the failure threshold all may involve different consequences on the upcoming trip of the vehicle system. Replacing or moving the coupler may take less time than moving the vehicle, but also may decrease the failure metric by a lesser amount. Changing the driving plan may decrease the failure metric by a larger amount, but also may cause the vehicle system to fall behind schedule and violate a contractual agreement. The consequences of the various responsive actions may be weighed to determine which responsive action to implement.

At 314, the vehicle system may proceed on the upcoming trip. If a responsive action was implemented at 312, the method 300 may be repeated after implementing the responsive action and before commencing the trip. Repeating the method 300 may be performed in order to ensure that the responsive action does not cause the failure metric of another coupler to become too large (e.g., and exceed the failure threshold). The accumulated fatigue metric of the coupler or couplers in the vehicle system may be updated during and/or after the trip based on the fatigue that is experienced by the couplers during the trip.

In one embodiment, the method 300 may be performed prior to the upcoming trip beginning. For example, the method 300 may be completed for one or more (or all) couplers prior to the vehicle system starting the trip. Additionally or alternatively, the method 300 may be performed during movement along the trip. The method 300 can be performed one or more times during the trip to examine the increasing accumulated fatigue metric on the couplers, to examine the additional upcoming fatigue metric that is expected to be experienced by the couplers during one or more upcoming segments of the trip, to determine if any couplers are likely to fail, and/or to implement one or more of the responsive actions described herein.

The method 300 may be performed without determining the accumulated fatigue metric. For example, the method 300 may estimate the upcoming fatigue metric for a coupler and determine whether to implement one or more responsive actions based on the upcoming fatigue metric, without considering the accumulated fatigue metric. Additionally or alternatively, the method 300 may be performed by assigning a default or designated value to the accumulated fatigue metric, such as a value of zero, a value based on a historical average of several couplers, etc.

Figure 5:
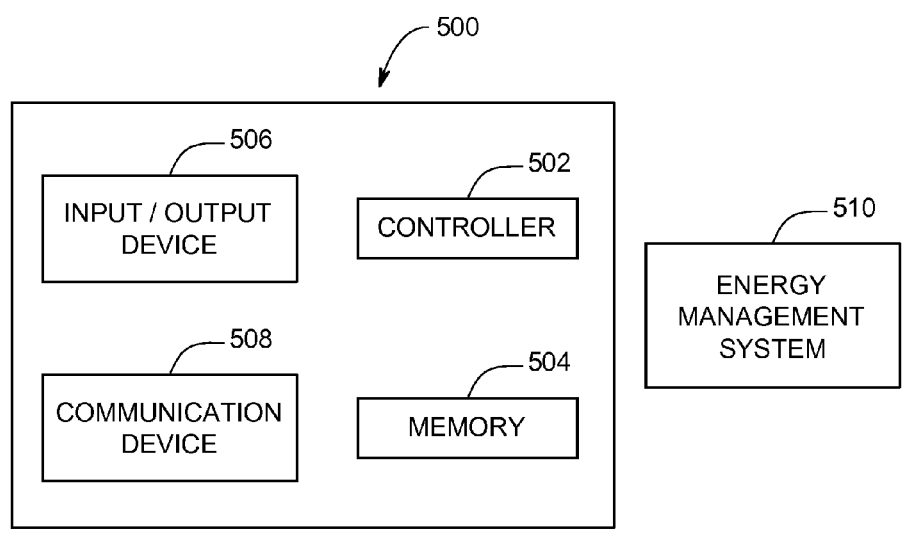
FIG. 5 is a schematic diagram of one embodiment of a coupler monitoring system.

FIG. 5 is a schematic diagram of one embodiment of a coupler monitoring system 500. The system 500 may be disposed onboard one or more of the vehicles 104, 106 shown in FIG. 1. Alternatively, some or all components of the system 500 may be disposed off-board the vehicle system 100 shown in FIG. 1. The system 500 includes one or more input and/or output devices 506 ("Input/Output Device" in FIG. 5), such as keyboards, throttles, switches, buttons, pedals, microphones, speakers, displays, touch-screens, and the like. The input/output device 506 may be used to present output of the system 500, such as accumulated fatigue metrics, upcoming fatigue metrics, driving plans, vehicle characteristics, route characteristics, failure probabilities, failure thresholds, etc. The input/output device 506 may be used to receive input from an operator or other source, such as accumulated fatigue metrics, upcoming fatigue metrics, driving plans, vehicle characteristics, route characteristics, failure probabilities, failure thresholds, etc.

A communication device 508 communicates with one or more vehicles, off-board locations, or the like. The communication device 508 can communicate (e.g., send and/or receive) data such as accumulated fatigue metrics, upcoming fatigue metrics, driving plans, vehicle characteristics, route characteristics, failure probabilities, failure thresholds, etc. The communication device 508 can represent transceiving circuitry, such as modems, antennas, buses, etc., for communicating data via one or more wired and/or wireless connections.

A controller 502 represents a hardware and/or software system that operates to perform one or more functions described herein. For example, the controller 502 can represent hardware circuitry that includes and/or is connected with one or more processors (e.g., microprocessors, field programmable gate arrays, integrated circuits, or other electronic logic-based devices) that perform operations based on instructions stored on a tangible and non-transitory computer readable storage medium, such as a memory 504. The controller 502 performs some or all of the operations described in connection with the method 300 to determine or obtain accumulated fatigue metrics of couplers, determine upcoming fatigue metrics of the couplers, determine failure probabilities of the couplers, determine failure thresholds, determine whether the failure probabilities exceed failure thresholds, and/or implement responsive actions, as described above. The memory 504 can store the accumulated fatigue metrics, updated accumulated fatigue metrics, unique identities of the couplers (to aid in associating fatigues, thresholds, and/or probabilities with the couplers), driving plans, vehicle characteristics, route characteristics, etc., for use by the controller 502, as described herein.

The controller 502 may communicate with an energy management system 510 that receives input to create a driving plan or a trip plan. For example, the energy management system 510 may receive trip data, vehicle data, and/or route data in order to create a driving plan. The driving plan can be communicated to the controller 502 for use in monitoring couplers, as described above.

Although connections between the components in FIG. 5 are not shown, two or more (or all) of the illustrated components may be connected by one or more wired and/or wireless connections, such as cables, busses, wires, wireless networks, and the like.

In one embodiment, a method (e.g., for monitoring coupler fatigue) includes determining an upcoming fatigue metric representative of fatigue that is to be experienced by a coupler configured to connect plural vehicles in a vehicle system, determining whether a failure metric of the coupler during the upcoming trip exceeds a designated failure threshold (where the failure metric is based on the upcoming fatigue metric), and, responsive to determining that the failure metric exceeds the designated failure threshold, one or more of: notifying an operator of the upcoming fatigue metric, displaying one or more of the upcoming fatigue metric or the failure metric, changing a driving plan for controlling movement of the vehicle system during the upcoming trip, and/or changing a characteristic of the vehicle system.

In one aspect, the method also includes obtaining an accumulated fatigue metric of the coupler that estimates previously experienced fatigue of the coupler during one or more previous trips.

In one aspect, the accumulated fatigue metric estimates one or more of an age of the coupler, a number of force cycles previously experienced by the coupler, wherein the force cycles represent changes in a force previously exerted on the coupler, a magnitude of one or more of the force cycles previously experienced by the coupler, a distance previously traveled by the coupler, one or more characteristics of terrain over which the coupler previously traveled, one or more characteristics of one or more other vehicle systems in which the coupler previously traveled, and/or an in-vehicle system position of the coupler in the one or more other vehicle systems in which the coupler previously traveled.

In one aspect, the method also includes determining an updated accumulated fatigue metric of the coupler by incorporating the upcoming fatigue metric into the accumulated fatigue metric.

In one aspect, the upcoming fatigue metric is based on one or more of a number of force cycles to be experienced by the coupler during the upcoming trip (where the force cycles represent changes in a force that are to be exerted on the coupler during the upcoming trip), a magnitude of one or more of the force cycles to be experienced by the coupler during the upcoming trip, a distance to be traveled by the coupler during the upcoming trip, one or more characteristics of terrain over which the coupler will travel during the upcoming trip, one or more characteristics of the vehicle system in which the coupler will travel during the upcoming trip, a historical trend of upcoming fatigue metrics for one or more other couplers, and/or an in-vehicle system position of the coupler in the vehicle system in which the coupler will travel during the upcoming trip.

In one aspect, the method also includes determining the designated failure threshold based on one or more of a type of one or more of the vehicles in the vehicle system, a location of a route over which the upcoming trip extends, and/or a priority of the vehicle system during the upcoming trip relative to one or more other vehicle systems.

In one aspect, the driving plan designates one or more operational settings of the vehicle system based on one or more of time or distance of the upcoming trip. Changing the one or more of the driving plan or the characteristic of the vehicle system can include changing the one or more operational settings of the vehicle system to reduce one or more of the upcoming fatigue metric or the failure metric.

In one aspect, changing the one or more of the driving plan or the characteristic of the vehicle system includes removing at least one of the vehicles that is to be connected with the coupler during the upcoming trip from the vehicle system so that the at least one of the vehicles is not included in the vehicle system for the upcoming trip.

In one aspect, changing the one or more of the driving plan or the characteristic of the vehicle system includes changing an in-vehicle system position of at least one of the vehicles or the coupler in the vehicle system for the upcoming trip.

In one aspect, changing the one or more of the driving plan or the characteristic of the vehicle system includes implementing restrictions on manual changes to one or more operational settings of the vehicle system.

In one embodiment, a system (e.g., a coupler monitoring system) includes a controller configured to determine an upcoming fatigue metric that is to be experienced by a coupler configured to connect plural vehicles in a vehicle system. The controller also is configured to determine whether a failure metric of the coupler during the upcoming trip exceeds a designated failure threshold (the failure metric is based on the accumulated fatigue metric). Responsive to determining that the failure metric exceeds the designated failure threshold, the controller is configured to one or more of: notify an operator of the upcoming fatigue metric, display one or more of the upcoming fatigue metric or the failure metric, change a driving plan for controlling movement of the vehicle system during the upcoming trip, and/or direct a change in a characteristic of the vehicle system.

In one aspect, the controller also is configured to obtain an accumulated fatigue metric of the coupler that estimates previously experienced fatigue of the coupler.

In one aspect, the accumulated fatigue metric represents one or more of an age of the coupler, a number of force cycles previously experienced by the coupler, wherein the force cycles represent changes in a force previously exerted on the coupler, a magnitude of one or more of the force cycles previously experienced by the coupler, a distance previously traveled by the coupler, one or more characteristics of terrain over which the coupler previously traveled, one or more characteristics of one or more other vehicle systems in which the coupler previously traveled, and/or an in-vehicle system position of the coupler in the one or more other vehicle systems in which the coupler previously traveled.

In one aspect, the controller is configured to determine an updated accumulated fatigue metric of the coupler by incorporating the upcoming fatigue metric to the accumulated fatigue metric.

In one aspect, the controller is configured to determine the upcoming fatigue metric as an estimate of one or more of a number of force cycles to be experienced by the coupler during the upcoming trip (where the force cycles represent changes in a force that are to be exerted on the coupler during the upcoming trip), a magnitude of one or more of the force cycles to be experienced by the coupler during the upcoming trip, a distance to be traveled by the coupler during the upcoming trip, one or more characteristics of terrain over which the coupler will travel during the upcoming trip, one or more characteristics of the vehicle system in which the coupler will travel during the upcoming trip, and/or an in-vehicle system position of the coupler in the vehicle system in which the coupler will travel during the upcoming trip.

In one aspect, the controller also is configured to determine the designated failure threshold based on one or more of a type of one or more of the vehicles in the vehicle system, a location of a route over which the upcoming trip extends, and/or a priority of the vehicle system during the upcoming trip relative to one or more other vehicle systems.

In one aspect, the driving plan designates one or more operational settings of the vehicle system based on one or more of time or distance of the upcoming trip. The controller can be configured to change the one or more of the driving plan or the characteristic of the vehicle system by changing the one or more operational settings of the vehicle system to reduce one or more of the upcoming fatigue metric or the failure metric.

In one aspect, the controller is configured to change the one or more of the driving plan or the characteristic of the vehicle system by directing at least one of the vehicles that is to be connected with the coupler during the upcoming trip to be removed from the vehicle system so that the at least one of the vehicles is not included in the vehicle system for the upcoming trip.

In one aspect, the controller is configured to change the one or more of the driving plan and/or the characteristic of the vehicle system by directing that an in-vehicle system position of at least one of the vehicles or the coupler in the vehicle system for the upcoming trip be changed.

In one aspect, the controller is configured to change the one or more of the driving plan and/or the characteristic of the vehicle system by implementing restrictions on manual changes to one or more operational settings of the vehicle system.

In one embodiment, a method (e.g., for monitoring coupler fatigue) includes determining an accumulated fatigue metric that estimates previously experienced fatigue by a coupler configured to connect plural vehicles in a vehicle system during one or more previous trips of the coupler, determining whether a failure metric of the coupler during an upcoming trip of the vehicle system exceeds a designated failure threshold (where the failure metric is based on the accumulated fatigue metric of the coupler), and, responsive to determining that the failure metric exceeds the designated failure threshold, one or more of notifying an operator of the upcoming fatigue metric, displaying one or more of the accumulated fatigue metric or the failure metric, changing a driving plan for controlling movement of the vehicle system during the upcoming trip, and/or changing a characteristic of the vehicle system.

In one aspect, the method also includes determining an upcoming fatigue metric that estimates fatigue to be experienced by the coupler, where the failure metric is based on a combination of the accumulated fatigue metric and the upcoming fatigue metric.

In one aspect, one or more of changing the driving plan or changing the characteristic of the vehicle system includes one or more of changing one or more operational settings of the vehicle system that are designated by the driving plan to reduce one or more of the upcoming fatigue metric or the failure metric, removing at least one of the vehicles that is to be connected with the coupler during the upcoming trip from the vehicle system so that the at least one of the vehicles is not included in the vehicle system for the upcoming trip, changing an in-vehicle system position of at least one of the vehicles in the vehicle system for the upcoming trip, automatically scheduling one or more of inspection, maintenance, or repair of the coupler at a time that is based on the updated accumulated fatigue metric, and/or implementing restrictions on manual changes to one or more operational settings of the vehicle system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments.

Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A method comprising:
   obtaining input from at least one of a first input/output device, communication device, or a computer readable storage medium;
   processing the input in a controller to determine an upcoming fatigue metric representative of fatigue experienced a coupler during use of the coupler to connect plural vehicles in a vehicle system,
   wherein the controller uses the upcoming fatigue metric to determine a failure metric of the coupler;
   wherein the controller determines a designated failure threshold based on one or more of a type of one or more of the vehicles in the vehicle system, a location of a route over which an upcoming trip extends, or a priority of the vehicle system during the upcoming trip relative to one or more other vehicle systems; and
   wherein the controller determines whether the failure metric of the coupler during an upcoming trip exceeds the designated failure threshold; and
   responsive to a determination in the controller that the failure metric exceeds the designated failure threshold, at least one action is performed, wherein the action comprises:
   providing notification of the upcoming fatigue metric,
   displaying at least one of the upcoming fatigue metric, or the failure metric on at least one of the first input/output device or a second input/output device,
   changing a driving plan for controlling movement of the vehicle system during the upcoming trip, or
   changing a characteristic of the vehicle system.

2. The method of claim 1, further comprising obtaining an accumulated fatigue metric of the coupler that estimates previously experienced fatigue of the coupler during one or more previous trips.

3. The method of claim 2, wherein the accumulated fatigue metric estimates one or more of:
   an age of the coupler,
   a number of force cycles previously experienced by the coupler, wherein the force cycles represent changes in a force previously exerted on the coupler,
   a magnitude of one or more of the force cycles previously experienced by the coupler,
   a distance previously traveled by the coupler, one or more characteristics of terrain over which the coupler previously traveled,
   one or more characteristics of one or more other vehicle systems in which the coupler previously traveled, or
   an in-vehicle system position of the coupler in the one or more other vehicle systems in which the coupler previously traveled.

4. The method of claim 2, further comprising determining an updated accumulated fatigue metric of the coupler by incorporating the upcoming fatigue metric into the accumulated fatigue metric.

5. The method of claim 1, wherein the upcoming fatigue metric is based on one or more of:
a number of force cycles to be experienced by the coupler during the upcoming trip, wherein the force cycles represent changes in a force that are to be exerted on the coupler during the upcoming trip,
a magnitude of one or more of the force cycles to be experienced by the coupler during the upcoming trip,
a distance to be traveled by the coupler during the upcoming trip,
one or more characteristics of terrain over which the coupler will travel during the upcoming trip,
one or more characteristics of the vehicle system in which the coupler will travel during the upcoming trip,
a historical trend of upcoming fatigue metrics for one or more other couplers, or
an in-vehicle system position of the coupler in the vehicle system in which the coupler will travel during the upcoming trip.

6. The method of claim 1, wherein the driving plan designates one or more operational settings of the vehicle system based on one or more of time or distance of the upcoming trip, and wherein changing the one or more of the driving plan or the characteristic of the vehicle system includes changing the one or more operational settings of the vehicle system to reduce one or more of the upcoming fatigue metric or the failure metric.

7. The method of claim 1, wherein changing the one or more of the driving plan or the characteristic of the vehicle system includes removing at least one of the vehicles that is to be connected with the coupler during the upcoming trip from the vehicle system so that the at least one of the vehicles is not included in the vehicle system for the upcoming trip.

8. The method of claim 1, wherein changing the one or more of the driving plan or the characteristic of the vehicle system includes implementing restrictions on manual changes to one or more operational settings of the vehicle system.

9. A system comprising:
a controller;
a first input/output device configured to provide input to the controller;
a computer readable storage medium configured to provide at least one of input to or output from the controller;
optionally, a communication device configured to provide at least one of input to or output from the controller; and
optionally, a second input/output device configured to display output from the controller;
wherein the controller is configured to process input from at least one of the input/output device, the communication device, or the computer readable storage medium to determine an upcoming fatigue metric of a coupler during use of the coupler to connect plural vehicles in a vehicle system;
wherein the controller is configured to determine a designated failure threshold based on one or more of a type of one or more of the vehicles in the vehicle system, a location of a route over which an upcoming trip extends, or a priority of the vehicle system during the upcoming trip relative to one or more other vehicle systems;
wherein the controller is configured to determine whether a failure metric of the coupler during the upcoming trip exceeds the designated failure threshold, wherein the failure metric is based on the upcoming fatigue metric,
wherein the controller is configured to determine the failure metric exceeds the designated failure threshold and
wherein the controller is configured to perform at least one action wherein the action comprises:
providing notification of the upcoming fatigue metric,
displaying at least one of the upcoming fatigue metric or the failure metric on at least one of the first input/output device or the second input/output device,
changing a driving plan for controlling movement of the vehicle system during the upcoming trip, or
changing a characteristic of the vehicle system.

10. The system of claim 9, wherein the controller also is configured to obtain an accumulated fatigue metric of the coupler that estimates previously experienced fatigue of the coupler.

11. The system of claim 10, wherein the accumulated fatigue metric represents one or more of:
an age of the coupler,
a number of force cycles previously experienced by the coupler, wherein the force cycles represent changes in a force previously exerted on the coupler,
a magnitude of one or more of the force cycles previously experienced by the coupler,
a distance previously traveled by the coupler,
one or more characteristics of terrain over which the coupler previously traveled,
one or more characteristics of one or more other vehicle systems in which the coupler previously traveled, or
an in-vehicle system position of the coupler in the one or more other vehicle systems in which the coupler previously traveled.

12. The system of claim 10, wherein the controller is configured to determine an updated accumulated fatigue metric of the coupler by incorporating the upcoming fatigue metric to the accumulated fatigue metric.

13. The system of claim 9, wherein the controller is configured to determine the upcoming fatigue metric as an estimate of one or more of:
a number of force cycles to be experienced by the coupler during the upcoming trip, wherein the force cycles represent changes in a force that are to be exerted on the coupler during the upcoming trip,
a magnitude of one or more of the force cycles to be experienced by the coupler during the upcoming trip,
a distance to be traveled by the coupler during the upcoming trip,
one or more characteristics of terrain over which the coupler will travel during the upcoming trip, one or more characteristics of the vehicle system in which the coupler will travel during the upcoming trip, or
an in-vehicle system position of the coupler in the vehicle system in which the coupler will travel during the upcoming trip.

14. The system of claim 9, wherein the driving plan designates one or more operational settings of the vehicle system based on one or more of time or distance of the upcoming trip, and wherein the controller is configured to change the one or more of the driving plan or the characteristic of the vehicle system by changing the one or more operational settings of the vehicle system to reduce one or more of the upcoming fatigue metric or the failure metric.

15. The system of claim 9, wherein the controller is configured to change the one or more of the driving plan or the characteristic of the vehicle system by directing at least one of the vehicles that is to be connected with the coupler during the upcoming trip to be removed from the vehicle system so that the at least one of the vehicles is not included in the vehicle system for the upcoming trip.

16. The system of claim 9, wherein the controller is configured to change the one or more of the driving plan or the characteristic of the vehicle system by implementing restrictions on manual changes to one or more operational settings of the vehicle system.

17. A method comprising:
obtaining input from at least one of a first input/output device, communication device, or a computer readable storage medium;
processing the input in a controller to determine an accumulated fatigue metric that is an estimate of fatigue previously experienced by a coupler during use of the coupler to connect plural vehicles in a vehicle system,
wherein the controller determines an upcoming fatigue metric that estimates fatigue to be experienced by the coupler;
wherein the controller determines a failure metric based on a combination of the accumulated fatigue metric and the upcoming fatigue metric;
wherein the controller determines whether the failure metric of the coupler for an upcoming trip of the vehicle system exceeds a designated failure threshold; and
responsive to a determination in the controller that the failure metric exceeds the designated failure threshold, at least one action is performed, wherein the action comprises:
providing notification of the upcoming fatigue metric,
displaying at least one of the accumulated fatigue metric or the failure metric on at least one of the first input/output device or a second input/output device,
changing a driving plan for controlling movement of the vehicle system during the upcoming trip, or
changing a characteristic of the vehicle system.

18. The method of claim 17, wherein one or more of changing the driving plan or changing the characteristic of the vehicle system includes one or more of:
changing one or more operational settings of the vehicle system that are designated by the driving plan to reduce one or more of the upcoming fatigue metric or the failure metric;
removing at least one of the vehicles that is to be connected with the coupler during the upcoming trip from the vehicle system so that the at least one of the vehicles is not included in the vehicle system for the upcoming trip;
changing an in-vehicle system position of at least one of the vehicles in the vehicle system for the upcoming trip;
automatically scheduling one or more of inspection, maintenance, or repair of the coupler at a time that is based on the updated accumulated fatigue metric; or
implementing restrictions on manual changes to one or more operational settings of the vehicle system.

19. A method comprising:
obtaining input from at least one of a first input/output device, communication device, or a computer readable storage medium;
processing the input in a controller to determine an upcoming fatigue metric representative of fatigue experienced a coupler during use of the coupler to connect plural vehicles in a vehicle system,
wherein the controller uses the upcoming fatigue metric to determine a failure metric of the coupler, and
wherein the controller determines whether the failure metric of the coupler during an upcoming trip exceeds a designated failure threshold; and
responsive to a determination in the controller that the failure metric exceeds the designated failure threshold, at least one action is performed, wherein the action comprises:
providing notification of the upcoming fatigue metric,
displaying at least one of the upcoming fatigue metric or the failure metric on at least one of the first input/output device or a second input/output device,
changing a driving plan for controlling movement of the vehicle system during the upcoming trip, or
changing a characteristic of the vehicle system;
wherein changing the one or more of the driving plan or the characteristic of the vehicle system includes changing an in-vehicle system position of at least one of the vehicles or the coupler in the vehicle system for the upcoming trip.

20. A system comprising:
a controller;
a first input/output device configured to provide input to the controller;
a computer readable storage medium configured to provide at least one of input to or output from the controller;
optionally, a communication device configured to provide at least one of input to or output from the controller; and
optionally, a second input/output device configured to display output from the controller;
wherein the controller is configured to process input from at least one of the input/output device, the communication device or the computer readable storage medium to determine an upcoming fatigue metric of a coupler during use of the coupler to connect plural vehicles in a vehicle system;
wherein the controller is configured to determine whether a failure metric of the coupler during an upcoming trip exceeds a designated failure threshold, wherein the failure metric is based on the upcoming fatigue metric,
wherein the controller is configured to determine whether the failure metric exceeds the designated failure threshold and
wherein the controller is configured to perform at least one action wherein the action comprises:
providing notification of the upcoming fatigue metric,
displaying at least one of the upcoming fatigue metric or the failure metric on at least one of the first input/output device or the second input/output device,
changing a driving plan for controlling movement of the vehicle system during the upcoming trip, or
changing a characteristic of the vehicle system; wherein the controller is configured to change the one or more of the driving plan or the characteristic of the vehicle system by directing that an in-vehicle system position of at least one of the vehicles or the coupler in the vehicle system for the upcoming trip be changed.

\* \* \* \* \*